United States Patent Office 3,373,150
Patented Mar. 12, 1968

3,373,150
POLYMERISING VINYL CHLORIDE
Gordon Edmund Alfred Pears, St. Albans, and Andrzej Pajaczkowski, Harpenden, England, assignors to Imperial Chemical Industries Limited, London, England, a corporation of Great Britain
No Drawing. Filed Dec. 2, 1963, Ser. No. 327,511
Claims priority, application Great Britain, Dec. 7, 1962, 46,247/62
21 Claims. (Cl. 260—92.8)

ABSTRACT OF THE DISCLOSURE

Paste grade vinyl chloride polymers are prepared by homogenised dispersion polymerisation using dialkyl peroxydicarbonate catalysts, in which the alkyl groups contain at least 5 carbon atoms, in conjunction with long chain peroxides, thereby obviating the long reaction times associated with such peroxides when used alone and the excessive build up occurring with the use of peroxydicarbonates alone.

---

The present invention relates to the polymerisation of vinyl chloride and more particularly to its polymerisation in the presence of monomer-soluble catalysts.

It is known that by choosing vinyl chloride polymers in the form of small particles (that is, about 0.1–2 microns) relatively stable dispersions of the polymers in plasticisers may be formed which are gellable on heating to give protective coatings or self-supporting articles. The stability of these dispersions, or pastes as they are usually called, depends largely upon the average polymer particle size and the size range of the particles: for example, if the average polymer particle size is too great, sedimentation will tend to occur when the paste is left to stand. Upon the same variables also depend the viscosity characteristics of the pastes such as their initial viscosity upon formation and their rate of change of viscosity with time on standing. For example, where the paste contains a large number of particles of less than 0.1 micron in size, its viscosity may increase at an undesirably rapid rate on standing.

To obtain certain desirable properties in the paste, such as a low initial viscosity and only a slow increase in viscosity on ageing it is generally necessary to use a mixture of at least two different particle sizes covering the whole or part of the range 0.1–2 microns. The manufacture of such a mixture can be difficult to achieve using conventional emulsion polymerisation techniques unless two or more separately prepared latices of the required different particle sizes are blended together. Careful control of both the polymerisation and the blending is required in order to achieve a consistent product.

It has been found that by homogenising a dispersion of the monomer in water in the presence of a surfactant, and then polymerising the homogenised dispersion, the resultant polymer may be obtained in the form of particles within the size range of about 0.1–2 microns. This effect is reproducible, and the process which is easy to operate may be used therefore to give consistent products. Homogenisation of the monomer dispersion may be effected by the application of a shear force to it. A large number of suitable forms of apparatus may be used for this purpose such as, for example, colloid mills, high speed pumps, vibratory stirrers, ultrasonic devices and high speed stirrers which cause the dispersion to impinge upon flat baffles by the action of centrifugal force. Suitable control of the homogenisation step will control the particle size of the polymeric product.

Pastes developed from polymers formed by the polymerisation of such an homogenised dispersion have generally improved viscosity characteristics shown in low initial viscosity, lower rates of ageing and improved consistency of the paste.

The catalyst generally preferred for the polymerisation of homogenised dispersions is a long chain diacyl peroxide, generally lauroyl peroxide, but with normal amounts of this catalyst the polymerisation tends to be undesirably slow at temperatures at which polymer having the required properties can be made. If a greater amount of catalyst is used in an effort to reduce the reaction time, the polymeric product is found to suffer from poor heat stability. The use of peroxydicarbonates, which are more active catalysts by themselves, tends to increase the number of particles in the polymeric product having a size of less than 0.1 micron to an undesirable extent and also causes heavy accumulation of undispersed polymer, known as "build-up," in the polymerisation vessel. The clearance of the build-up reduces the availability of the reaction vessels for polymerisation and is in itself also a costly process.

It is an object of the present invention to provide a peroxydicarbonate catalysed process in which vinyl chloride is polymerised as an homogenised dispersion in water and in which wet polymer build-up in the reaction vessel is reduced below that normally obtained using the peroxydicarbonate as catalyst and preferably to an amount which is of the order of that normally encountered in an homogenisation process based on lauroyl peroxide as catalyst.

According to the present invention we provide a process comprising dispersing vinyl chloride and from 0 to 20% of its weight of at least one other mono-ethylenically unsaturated copolymerisable monomer in water together with a surface-active agent and at least 0.005% by weight of the polymerisable monomer of a catalyst comprising one or more organic peroxydicarbonates in which the organic groups attached to each carbonate group each contain at least 5 carbon atoms, homogenising the resulting dispersion and polymerising the homogenised dispersion at an elevated temperature in the presence of an amount hereinafter defined of long-chain material comprising at least one compound selected from the group consisting of peroxides having the structure P.CO.OO.CO.P' in which P and P' are each alkyl or substituted alkyl radicals containing at least seven carbon atoms and may be the same or different.

The amount of long-chain material used is from 50% to 1500% by weight of the peroxydicarbonate.

Monomers which may be copolymerised with vinyl chloride include, for example, alkenes (e.g. ethylene, propylene, n-butene or isobutene), vinyl acetate, acrylonitrile, vinylidene chloride, acrylic and methacrylic acids and their esters and nitriles, vinyl ethers and maleic and fumaric acids, their esters and anhydride.

Our specified peroxydicarbonates may be represented by the structure XO.CO.OO.CO.OY in which X and Y are organic moieties each containing at least five carbon atoms; the common peroxydicarbonates are those in which X and Y are monovalent hydrocarbon or substituted hydrocarbon groups which may be the same or different. Our preferred peroxydicarbonates are the alkyl (including cycloalkyl) derivatives, particularly those in which X and Y each contain from 5 to 20 carbon atoms and particularly those in which X and Y are the same. We further prefer to use those peroxydicarbonates in which X and Y are each alkyl groups containing a straight chain of at least 4 carbon atoms connected to the carbonate group. Examples are di-n-amyl, diisoamyl, dihexyl, dioctyl, di-2-ethylhexyl, dinonyl, dilauryl and distearyl peroxydicarbonates. Peroxydicarbonates having fewer than five carbon atoms in the organic moieties tend to promote undesirable amounts of build-up in spite of the presence of the carbonyl compound. We have found that dialkyl peroxydicarbonates having from 6 to 13, and preferably from 8 to 10, carbon atoms in each alkyl group are very useful in the process of the invention. Mixtures of two or more peroxydicarbonates, such as peroxydicarbonates prepared from mixtures of alcohols having 7 to 9 carbon atoms, may be used in the process of the invention is desired.

The amount of peroxydicarbonate or mixture of peroxydicarbonates used is generally of the order of 0.01 to 0.10% by weight of the polymerisable monomers although amounts as small as 0.005% and amounts of up to 0.5% or higher may be used if desired. Below 0.005% the polymerisation becomes very slow while the use of amounts over about 0.5% by weight are generally precluded for economic reasons.

Of the long-chain peroxides which may be used in the process of the invention we prefer those in which P and P' are alkyl groups because of their ready availability. Those in which P and P' are the same alkyl groups are particularly preferred and examples are capryloyl peroxide, pelargonoyl peroxide, caproyl peroxide (derived from capric acid), undecyloyl peroxide, lauroyl peroxide, tridecyloyl peroxide, myristoyl peroxide, pentadecyloyl peroxide, palmitoyl peroxide, margaroyl peroxide, stearoyl peroxide, arachidoyl peroxide, behenoyl peroxide, lignoceroyl peroxide and cerotoyl peroxide. We have found that in general as the member of carbon atoms in the alkyl group decreases, the compound becomes less effective in reducing build-up and the use of a compound with less than seven carbon atoms in the group does not reduce the build-up to a useful extent.

With the increase in chain length, on the other hand, the peroxide generally increases in cost and we prefer to use those having from 9 to 19 carbon atoms in each alkyl group. We prefer that our peroxides have little or no chain branching since in general chain-branched compounds are less effective in reducing build-up. Lauroyl peroxide is generally used because of its ready availability.

In our process, these peroxides are used in amounts of from 50% to 1500% by weight of the peroxydicarbonate. The presence of less than 50% of the compound is generally insufficiently effective in reducing build-up but on the other hand the use of amounts above 1500% is uneconomical. Amounts of 200% to 800% are suitable under most conditions and especially favourable results may be obtained using about 300 to 500% by weight.

Our specified long-chain compounds may be added to the polymerisation medium after homogenisation, if desired. However, the efficiency of the compounds in reducing build-up is to some extent dependent upon the thoroughness with which they are dispersed through the medium and therefore where the addition is made after homogenisation, the compounds should be dispersed as uniformly as possible. It is generally preferred to add the compounds before homogenisation since in this way, effective dispersion is assured in most cases. In some instances, for example in the case where the long-chain compound is a solid not readily soluble in the vinyl chloride at the temperature of homogenisation, it may be useful to predisperse it in a suitable liquid before homogenising it in admixture with the other ingredients for the polymerisation. Our long-chain compounds may be added alone, in solution or as a dispersion in a suitable medium.

Any emulsifying agent or dispersing agent may be used as the surface-active agent. Emulsifying agents may be anionic, cationic or non-ionic. Examples of anionic agents are the sodium salts of sulphated and sulphonated hydrocarbons and fatty acids such as dioctyl sodium sulphosuccinate, sulphonated diesel oil and sodium lauryl sulphate. Examples of cationic agents are quaternary ammonium compounds such as stearamidopropyl dimethyl-β-hydroxyethyl ammonium nitrate, cetyl pyridinium chloride and cetyl trimethyl ammonium bromide. Examples of nonionic agents are block copolymers of propylene oxide and ethylene oxide.

We prefer to use anionic emulsifying agents since they are more efficient in stabilising the resultant polymer latex. Of these, some will be found to be more useful than others, depending on the process conditions, and the most suitable may be found by simple experiment.

Dispersing agents are generally protective colloids such as gelatin, methyl cellulose, high molecular weight polyethylene oxides, gum tragacanth and completely or partially hydrolysed polyvinyl acetates.

Where an emulsifying agent is chosen, amounts of 0.3 to 2% based on the weight of polymerisable monomers are generally suitable although greater or lesser amounts may be used in some circumstances since the efficiencies of individual agents vary. For dispersing agents, contrary to experience in conventional granular polymerisation processes, amounts of up to 4% or even 5% by weight of the monomers may be required for the best results. While the amount of dispersing agent used will depend to some extent upon the choice of agent, less than 1% is generally not satisfactory in this process.

The suspension of monomer in water may be formed by any suitable means such as stirring the monomer, water and surface active agent (i.e. emulsifier or dispersing agent) together in a vessel or metering the ingredients with stirring into the feed line to the homogeniser. The catalyst is also added at this stage in order to disperse it effectively throughout the suspension.

Homogenisation of the suspension of monomer in water may be effected by any suitable process and using any suitable apparatus such as those mentioned hereinbefore. We have found that homogenisation is simply effected and readily controlled by using a high speed pump. A two-stage pump gives very good results. The pressures of each stage are adjusted to give the required particle size in the polymer and suitably may be varied in the range of from 5000 to 500 pounds per square inch. Greater or smaller pressures may be used if desired but we have found that a first stage pressure of about 2000 p.s.i. combined with a second stage pressure of about 500 p.s.i. generally gives consistently good results.

The suspension may be formed in a holding vessel, passed through the homogeniser and thence to the polymerisation vessel or it may be formed in the polymerisation vessel and cycled through the homogeniser and back to the polymerisation vessel before polymerisation. The cycle may be repeated if desired and recycling may be operated continuously.

Since the suspension contains the polymerisation catalyst, the homogenisation is normally effected at a temperature below that at which polymerisation would occur or at which the induction period of the polymerisation is long enough to allow for complete homogenisation prior to the commencement of polymerisation. In general, homogenisation may be effected suitably at about room temperature or a little above, say 10° C. to 30° C.

The polymerisation is generally effected in the absence of any substantial quantities of air or oxygen and may be carried out conveniently either under an atmosphere of inert gas such as nitrogen or under the vapour of the monomers. Polymerisation is normally effected at temperatures of from 40° C. to 65° C. Temperatures below 40° C. and above 65° C. may be used if desired but with most of the peroxydicarbonates described hereinbefore polymerisation may be very slow below 40° C. and above 65° C. the molecular weights of the polymeric products tend to be unsuitably low, for example, for purposes where their strength is to be utilised.

The molecular weights of the products may be controlled to some extent if desired by the addition of chain transfer agents such as methylene dichloride, chloroform or dichloro-ethane.

On completion of polymerisation, the polymer may be separated from the water by any suitable drying techniques such as tray-drying, drum-drying or spray-drying.

The products are polymers and copolymers of vinyl chloride having good resistance to chemicals and useful heat-stability. The products may be blended with any of the normal additives such as stabilisers, pigments, lubricants, mould-release agents, fillers and plasticisers and may be blended with other polymeric materials if desired. They may be moulded or extruded to give articles of many varied shapes. The homopolymers are particularly useful in the manufacture of pastes which may be used in shaping processes, e.g. involving open casting, rotational casting, compression moulding and injection moulding; in coating processes, e.g. by dipping, spreading or spraying techniques or in the manufacture of foams.

The invention is illustrated by the following examples in which all parts are expressed as parts by weight.

*Example 1*

175 parts of water, 100 parts of vinyl chloride, 1 part of a sulphonated diesel oil and 0.2 part of lauroyl peroxide were added to a stainless steel vessel from which most of the atmospheric oxygen had been removed by evacuation and purging with nitrogen. The mixture was stirred for fifteen minutes to give a coarse dispersion of the vinyl chloride in water. This mixture was then passed once through a two-stage high-speed pump homogeniser, the pressure of the first stage being 3000 p.s.i., and of the second stage 2000 p.s.i. and the homogenised mixture was passed to a stirred evacuated reaction vessel.

The reaction vessel was heated to 50° C. with stirring and the temperature was maintained constant at 50° C. for the duration of the reaction. After 11 hours the pressure in the reaction vessel began to drop and after 13 hours it had fallen from 100 to 75 p.s.i. gauge pressure. The remaining pressure was then released.

The product was in the form of a polymer latex having a solids content of 29.8% and the polymer particles varied in size from 0.1 to 0.9 micron. The wet weight of polymer build-up on the walls and stirrer of the reaction vessel was equivalent to 5% of the weight of the vinyl chloride monomer charged to the mixing vessel.

The procedure described above was repeated using 0.05 part of di-2-ethylhexyl peroxydicarbonate as catalyst in place of the 0.2 part of lauroyl peroxide. The pressure developed in the reaction vessel began to drop after only 6¼ hours, and after 7¾ hours, when it had fallen to 75 p.s.i. gauge pressure, the remaining pressure was released. The latex obtained had a solids content of 13.3% and the weight of wet pebble and build-up in the reaction vessel was equivalent to 75% of the weight of monomer initially charged. The latex also contained a substantial proportion of polymer particles below 0.1 micron.

In a third polymerisation, the previous procedure was repeated using a combination of 0.2 part of lauroyl peroxide and 0.05 part of di-2-ethylhexyl peroxydicarbonate as catalyst. Pressure drop occurred after 5¼ hours and the pressure had fallen to 75 p.s.i.g. after only six hours. The solids content of the latex was found to be 28.6 and the wet weight of the build-up was equivalent to 6% of the weight of monomer charge.

*Example 2*

Using the same procedure as described in Example 1, a coarse dispersion of 160 parts of water, 100 parts of vinyl chloride monomer, 0.2 part of di-3,5,5-trimethylhexanoyl peroxide and 1 part of dioctyl sodium sulphosuccinate was homogenised by a single pass through a two-stage high-speed pump homogeniser using a pressure of 3000 p.s.i. at the first stage and 500 p.s.i. at the second stage. The homogenised mixture was then polymerised at 50° C. Pressure in the reaction vessel started to fall after ten hours, showing that polymerisation of the vinyl chloride monomer was nearing completion and after 11 hours the residual pressure of 75 p.s.i.g. was released. The product was in the form of a latex having a solids content of 32.0%, and a high proportion of the polymer particles were within the size range 0.1–1.5 microns. The weight of wet build-up in the reaction vessel was equivalent to 12.5% by weight of the vinyl chloride monomer initially charged to the reaction vessel. The polymerisation was repeated using 0.05 part of di-iso-octyl peroxydicarbonate in place of the 0.2 part of di-3,5,5-trimethylhexanoyl peroxide. Pressure drop occurred after only 6¼ hours and the pressure had fallen to 75 p.s.i.g. after 7¼ hours. After releasing the residual pressure a latex of very low solids content was obtained and the wet weight of build-up in the autoclave was found to be equivalent to 70% of the monomer initially charged. A substantial proportion of the number of polymer particles in the latex were below 0.1 micron.

On repeating the polymerisation again but using a combination of 0.2 part of di-3,5,5-trimethylhexanoyl peroxide and 0.05 part of di-iso-octyl peroxydicarbonate, the pressure had fallen to 75 p.s.i.g. after only six hours. The latex solids content of the latex was 32.3% and the polymer particle size range and distribution were comparable to those obtained when using the 0.2 part of di-3,5,5-trimethylhexanoyl peroxide alone as catalyst. The wet weight of autoclave build-up was equivalent to only 9% of monomer used.

*Example 3*

A coarse dispersion was made of 137 parts of water, 100 parts of vinyl chloride monomer, 0.2 part of lauroyl peroxide and 1 part of sodium dodecyl benzene sulphonate. This coarse dispersion was homogenised by a single pass through a two-stage high-speed pump homogeniser using first and second stage pressures of 1500 and 500 p.s.i. and was then polymerised at 50° C. The reaction time was 11 hours to pressure drop and 13 hours to venting at 75 p.s.i.g. A latex having a polymer particle size of 0.1 to 1.2 microns and 32.3% solids content was obtained. The wet weight of build-up in the reaction vessel was equivalent to 5% by weight of the vinyl chloride initially charged.

On repeating the polymerisation with 0.035 part of di-3,5,5-trimethylhexyl peroxydicarbonate in place of the lauroyl peroxide, the reaction time to venting at 75 p.s.i.g. was 10 hours, but only a small yield of 20% solids latex was obtained and the weight of wet pebble and build-up in the reaction vessel was equivalent to 150% of the initial vinyl chloride monomer charge used.

In a further polymerisation, a combination of 0.2 part of lauroyl peroxide and 0.035 part of di-3,5,5-trimethylhexyl peroxydicarbonate was used as catalyst and the reaction time to venting was 6¾ hours. The weight of wet pebble and build-up in the reaction vessel was of the same order as when lauroyl peroxide was used alone (i.e. equivalent to 5% by weight of vinyl chloride used). The latex solids content was 36.7% and the polymer particle size was essentially between 0.1 and 1.2 microns.

*Example 4*

The polymerisation of a homogenised mixture was repeated using the same proportions and conditions as given in Example 3 except that a combination of 0.1 part of lauroyl peroxide and 0.035 part of di-3,5,5-trimethylhexyl peroxydicarbonate was used as catalyst. The reaction time to venting at 75 p.s.i.g. was 7½ hours and the weight of wet build-up in the reaction vessel was equivalent to 7.5% of the vinyl chloride monomer used.

*Example 5*

The process of Example 3 was repeated using 0.05 part of lauroyl peroxide and 0.035 part of di-3,5,5-trimethylhexyl peroxydicarbonate as catalyst. The reaction time to venting at 75 p.s.i.g. was 8¼ hours. A 33.5% solids latex was obtained with only a minor portion of the polymer particles below 0.1μ and the wet weight of build-up in the reaction vessel was equivalent to 17.5% of the monomer used.

Example 6

155 parts of water were charged to a reaction vessel followed by two parts of an 87% hydrolysed polyvinyl acetate having a viscosity as measured as a 4% aqueous solution at 25° C. of 20 centipoises and 0.2 part of lauroyl peroxide. After evacuating and purging the vessel with nitrogen, 100 parts of vinyl chloride monomer were charged and the mixture stirred for five minutes. At the end of this time the mixture was cycled through a two-stage high-speed pump homogeniser back into the reaction vessel. Recycling through the homogeniser was continued for ten minutes, the rate of flow through the homogeniser being adequate to ensure that at the end of this time essentially all of the monomer had been homogenised.

When homogenisation was completed the reaction vessel was heated to 50° C. and maintained at this temperature for the duration of the polymerisation. The pressure formed in the reaction vessel started decreasing after 10½ hours and after 13¾ hours had fallen to about 75 p.s.i.g., denoting that a high proportion of monomer had been polymerised and the residual pressure was released. A 24% solids latex was obtained with a particle size distribution of 0.1-4 microns. The wet weight of autoclave build-up was equivalent to 6% by weight of the monomer initially charged to the reaction vessel.

On using 0.05 part of di-isodecyl peroxydicarbonate in place of the lauroyl peroxide as catalyst, the reaction time was 10½ hours to venting at 75 p.s.i.g. The product was entirely in the form of a creamy coagulum of build-up, and the proportion of polymer particles below $0.1\mu$ had considerably increased.

In a third polymerisation in which a combination of 0.2 part of lauroyl peroxide and 0.05 part of di-isodecyl peroxydicarbonate was used as catalyst, the reaction time was 8¾ hours to venting at 75 p.s.i.g., a latex of solids content 26.4% was obtained and the weight of wet autoclave build-up was equivalent to 4% by weight of the monomer charge used. The particle size distribution (0.1-4 microns) was similar to that when lauroyl peroxide alone was used as catalyst.

Example 7

A polymerisation was carried out as described in Example 3 except that 0.2 part of capryloyl peroxide was used as catalyst and 1.0 part sodium lauryl sulphate as emulsifier. In this polymerisation pressure drop occurred after 11 hours and after 11¾ hours the residual pressure of 75 p.s.i.g. was released. The product was in the form of a partially coagulated latex which rapidly sedimented. Maximum polymer particle size was 1.8 microns and there was a high proportion of polymer particles below 0.1 micron in size. The weight of build-up in the reaction vessel represented 23% of the weight of vinyl chloride monomer initially used.

The polymerisation was repeated using 0.05 part of di-isodecyl peroxydicarbonate as catalyst. The reaction became uncontrollable after 6¼ hours and the pressure in the reaction vessel was released. The product obtained was in the form of a rapidly sedimenting latex (13.3% solids) and the weight of wet autoclave build-up was equivalent to 20% by weight of the monomer initially charged.

In a third polymerisation, a combination of 0.2 part of capryloyl peroxide and 0.05 part of di-isodecyl peroxydicarbonate was used as catalyst; reaction time to pressure drop was six hours, and seven hours to venting at 75 p.s.i.g. The product was in the form of a latex (solids content 32.3%) with a polymer particle size of up to 0.9 micron and only a small proportion below 0.1 micron. The weight of wet pebble and build-up was equivalent to only 8% of the vinyl chloride used.

We claim:
1. A process comprising dispersing vinyl chloride and 0 to 20% of its weight of at least one other ethylenically unsaturated copolymerisable monomer in water together with a surface-active agent and at least 0.005% by weight of the polymerisable monomer of at least one organic peroxydicarbonate in which the organic groups attached to each carbonate group each contain at least five carbon atoms, homogenising the resulting dispersion and polymerising the homogenised dispersion at an elevated temperature in the presence of from 50 to 1500% based on the weight of catalyst of long-chain material comprising at least one peroxide having the structure P.CO.OO.CO.P' in which P and P' are each selected from the group consisting of alkyl and substituted alkyl radicals containing at least seven carbon atoms, whereby the polymer particle size is in the range of about 0.1 to 4 microns.

2. A process according to claim 1 in which the long-chain material is present in an amount of from 200% to 800% by weight of the catalyst.

3. A process according to claim 2 in which the long-chain material is present in an amount of from 300% to 500% by weight of the catalyst.

4. A process according to claim 1 in which the long-chain material comprises at least one peroxide having the structure P.CO.OO.CO.P' where P and P' are the same and stand for an alkyl radical containing from 9 to 19 carbon atoms.

5. A process according to claim 1 in which the long-chain material is substantially free from chain-branching.

6. A process according to claim 1 in which the long-chain material comprises at least one peroxide selected from the group consisting of capryloyl peroxide, di-3,5,5-trimethyl hexanoyl peroxide and lauroyl peroxide.

7. A process according to claim 1 in which the catalyst comprises a dialkyl peroxydicarbonate in which the alkyl groups are the same and in which each alkyl group contains from 5 to 20 carbon atoms.

8. A process according to claim 1 in which the catalyst is a dialkyl peroxydicarbonate in which the alkyl groups are the same and in which each alkyl group contains a chain of at least 4 carbon atoms.

9. A process according to claim 8 in which the catalyst is a dialkyl peroxydicarbonate in which the alkyl groups are the same and in which each alkyl group contains from 6 to 13 carbon atoms.

10. A process according to claim 9 in which the catalyst is a dialkyl peroxydicarbonate in which the alkyl groups are the same and in which each alkyl group contains from 8 to 10 carbon atoms.

11. A process according to claim 1 in which the catalyst is selected from the group consisting of di-isoamyl peroxydicarbonate, di-2-ethyl hexyl peroxydicarbonate, di-isooctyl peroxydicarbonate, di-3,5,5-trimethylhexyl peroxydicarbonate, di-isodecyl peroxydicarbonate and a mixture of peroxydicarbonates derived from alcohols containing from 7 to 9 carbon atoms.

12. A process according to claim 1 in which the catalyst is present in an amount of from 0.005% to 0.5% based on the weight of polymerisable monomer.

13. A process according to claim 12 in which the catalyst is present in an amount of from 0.01% to 0.1% based on the weight of polymerisable monomer.

14. A process according to claim 1 which is carried out in the presence, as the surface active agent, of from 0.3 to 2% of an emulsifier, based on the weight of polymerisable monomer.

15. A process according to claim 14 in which the surface active agent is an anionic emulsifier.

16. A process according to claim 1 which is carried out in the presence, as the surface active agent, of from 1% to 5% of a dispersing agent, based on the weight of polymerisable monomer.

17. A process according to claim 1 in which the long-chain material is added to the dispersion before homogenisation.

18. A process according to claim 1 in which the homogenisation is effected in a high-speed two-stage pump.

19. A process according to claim 1 in which the polymerisation is effected at a temperature of from 40° C. to 65° C.

20. A vinyl chloride polymer made according to the process of claim 1.

21. A paste comprising a dispersion in a plasticiser therefor of a vinyl chloride polymer made by the process of claim 1.

References Cited

UNITED STATES PATENTS

| 3,022,283 | 2/1962 | Marous et al. | 260—92.8 |
| Re. 25,763 | 4/1965 | Marous et al. | 260—92.8 |
| 2,890,211 | 6/1959 | Lintala | 260—92.8 |

OTHER REFERENCES

Strain, F., et al.: Esters of Peroxycarbonic Acids in J. Am. Chem. Soc. 72, 1254, 1950.

JOSEPH L. SCHOFER, *Primary Examiner.*

H. WONG, *Assistant Examiner.*